United States Patent [19]

Shinoda et al.

[11] 4,090,578
[45] May 23, 1978

[54] BATTERY OPERATED FORK-LIFT TRUCKS

[75] Inventors: Akibumi Shinoda, Handa; Masahiko Shimizu, Obu, both of Japan

[73] Assignee: Kabushiki Kaisha Toyoda Jidoshokki Seisakusho, Kariya, Japan

[21] Appl. No.: 725,935

[22] Filed: Sep. 23, 1976

[30] Foreign Application Priority Data

Sep. 27, 1975 Japan .............................. 50/116863
Sep. 23, 1975 Japan .............................. 50/130533
Sep. 26, 1975 Japan .............................. 50/132594

[51] Int. Cl.² ............................................. B60K 17/30
[52] U.S. Cl. .................................... 180/52; 296/1 R; 180/54 E
[58] Field of Search ............. 296/1 R; 180/89.1, 65 R, 180/52, 54 E

[56] References Cited

U.S. PATENT DOCUMENTS 2,564,002  8/1951  Gibson ................................. 180/52
3,394,770  7/1968  Goodacre .......................... 180/54 E
3,722,613  3/1973  De Priester ........................... 180/52

*Primary Examiner*—Philip Goodman
*Attorney, Agent, or Firm*—Dennison, Dennison, Meserole & Pollack

[57] ABSTRACT

Disclosed is an improved battery operated fork-lift truck having at its rear end a frame structure comprising a plurality of vertically, horizontally or otherwise extending frame and wall members which define a plurality of compartments which are satisfactorily closed themselves and independent of one another to accommodate in a mutually isolated fashion a variety of equipment required for operation of the truck.

7 Claims, 7 Drawing Figures

BATTERY OPERATED FORK-LIFT TRUCKS

This invention relates to a battery operated fork-lift truck and more particularly, to the construction of a frame of such a truck.

There is known a battery operated fork-lift truck having adjacent its rear end a frame on which a battery, an electrical driving unit, a hydraulic system for actuating forks, a tank for hydraulic fluid and various electrical control devices are mounted. The frame defines a number of compartments which accommodate the driving unit, hydraulic system, electrical control devices and the like, respectively. The construction of such compartments has, however, been unsatisfactory in any fork-lift truck of the type discussed. Although the relative positions of those compartments vary from one truck to another, the compartments are not completely closed against one another, but communicate with one another to an undesirable extent for some reason or other. This construction causes a number of inconveniences. The electrical control devices tend to fail in an unduly short time because of their exposure to the heat generated by the motor or the dust or other foreign material from an exterior source during the movement of the truck or the load handling operation. If any hydraulic fluid leaks, it may easily reach a place in which no hydraulic fluid should be present. Hydraulic fluid may, for example, stain and cause damage to an electrical device during the inspection or repair of a hydraulic device. For maintenance work on a particular system on the truck, it is often not sufficient to open a compartment in which that particular system is accommodated, but it is also necessary to open a number of other compartments. It is also necessary to dismount parts of other systems for the inspection and repair of the particular system. Moreover, the tank for hydraulic fluid is located in the interior of the truck apart from the operator's cab. It is, thus, a troublesome job to replenish the tank with hydraulic fluid or change the hydraulic fluid. It is also no easy task to dismount the tank for maintenance purposes. Furthermore, the battery compartment has a fixed front end partition which sometimes prevents use of a larger battery which may from time to time be required to permit the truck to work more efficiently.

It is, therefore, an object of this invention to eliminate the aforementioned drawbacks of the prior art and provide an improved battery operated fork-lift truck.

According to this invention, there is provided a battery operated fork-lift truck comprising: an end frame member vertically extending from a base support adjacent to the rear end of the truck; an operator's cab provided behind the end frame member and open at the rear end of the truck; and a plurality of compartments defined by the end frame member around the operator's cab, the compartments being of substantially closed construction both individually and mutually and including a first compartment for hydraulic apparatus, a second compartment for electrical control devices and a third compartment for a driving unit.

The fork-lift truck of this invention includes a frame structure defining a plurality of compartments completely separated from one another to accommodate a driving unit, a hydraulic system and electrical control devices in a mutually isolated fashion, while each compartment has its own cover or door which closes the compartment satisfactorily. The compartment for electrical control devices is isolated from the heat generated by electric motors and any dust or other foreign material from an external source, so that there can occur no or little failure of any electrical control device due to such heat or dust. Likewise, there is no ingress of dust or other foreign material into the compartment for the hydraulic system, but the compartment is always kept clean. No devices or parts in the compartment for the driving unit or electrical control devices are spoiled with hydraulic fluid in the event of leakage in the compartment for the hydraulic system or during the maintenance work on any device or part in the latter compartment. Moreover, as all devices and parts mounted on the frame are classified according to their character and accommodated within the individual compartments as stated before, all maintenance work on any device or part in one compartment can be accomplished without opening any other compartment or dismantling any device or part in any other compartment.

According to a further feature of this invention, a tank for hydraulic fluid is conveniently located in a position which facilitates maintenance work on the tank and permits the tank to also serve as a guard or protection wall for the operator. This invention is further characterized by including a battery compartment which permits interchangeable use of batteries of various sizes or capacities. The battery compartment is open on three sides, so that no collection of combustible gases that might cause explosion can occur in the battery compartment during the charging of the battery.

These and other objects, features and advantages of this invention will become apparent from the following description of a preferred embodiment of this invention with reference to the accompanying drawings, in which.

Figure 1:
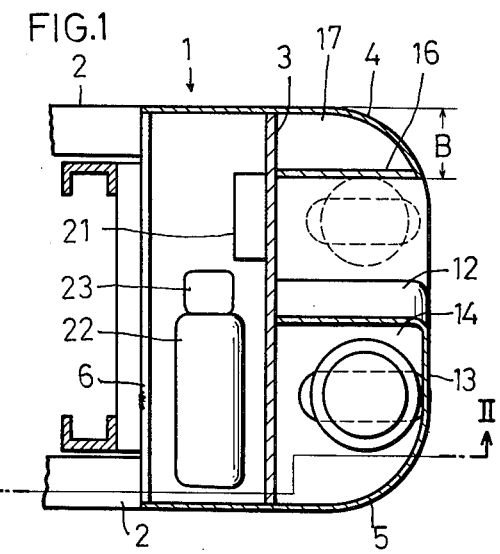
FIG. 1 is a top plan view of a rear end portion of the fork-lift truck embodying this invention and illustrates the truck in section along the line I—I of FIG. 2.
Figure 2:
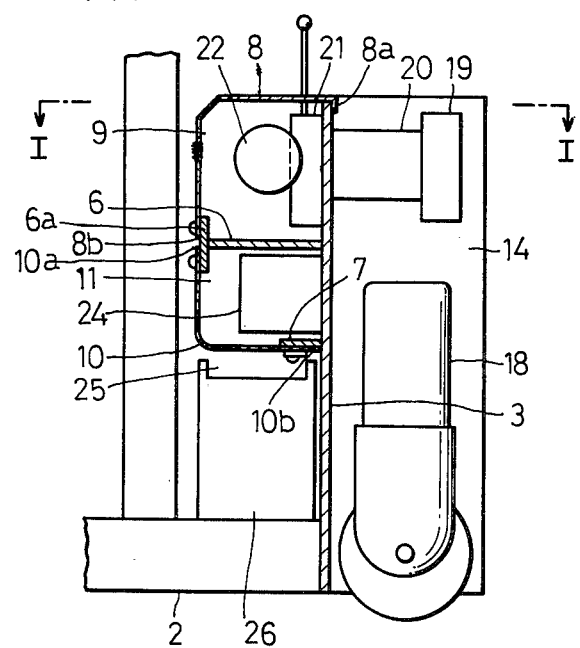
FIG. 2 is a side elevational view looking in the direction of the line II—II of FIG. 1.
Figure 5:
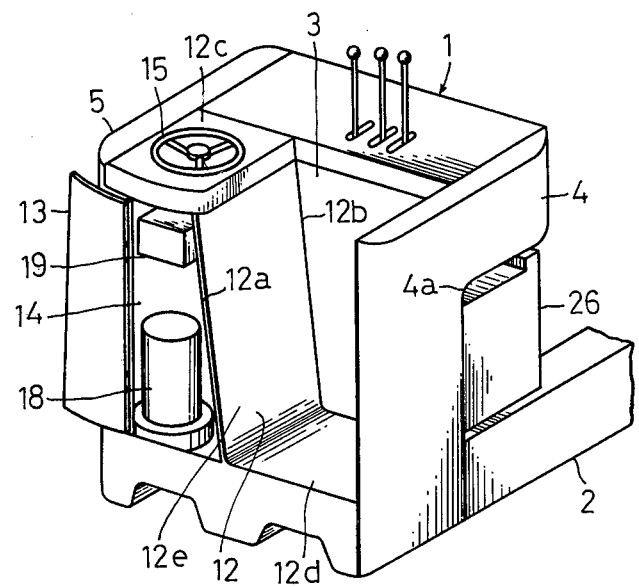
FIG. 5 is a perspective view of the truck shown in FIG. 2 as viewed from the rear side.

Referring now to the drawings more specifically and particularly to FIGS. 1 through 5 thereof, there is shown a battery operated fork-lift truck embodying this invention as generally indicated at 1. The truck 1 includes a base support comprising a pair of horizontally extending bottom frame members 2 connected by welding or otherwise to an upright end frame member 3 in the form of a flat plate adjacent to the rear end of the truck 1. A pair of vertically extending side frame members 4 and 5 are welded or otherwise connected to the opposite vertical edges of the end frame member 3. The side frame members 4 and 5 are of the inverted L shape as best shown in FIG. 5. Each side frame member comprises a vertical portion secured at the rear end of the truck 1 and a horizontal portion extending from the upper end of the vertical portion toward the front end of the truck 1. The vertical and horizontal portions define a shoulder or recess opening therebetween, such as shown at 4a in FIG. 5. The other side frame member 5 also includes a similar shoulder or recess opening, though not specifically shown in the drawings. The end frame member 3 is connected to the horizontal portions of the side frame members 4 and 5 to form an H shape as viewed in a horizontal plane as shown in FIG. 1. The end frame member 3 is also connected to the front edges of the vertical portions of the side frame members 4 and 5. Each of the side frame members 4 and 5 has an upper end formed with an inwardly extending right-angled bend for the purpose which will hereinafter become apparent. A horizontally extending partition wall plate 6 is provided in front of the end frame member 3, and has one end welded or otherwise connected to the upper central portion of the latter. At another end remote from the end frame member 3, the partition wall plate 6 is provided with a vertical flange 6a as shown in FIG. 2. The vertical flange 6a will serve as a cover support as hereinafter described. A horizontally extending cover supporting plate 7 is welded to the front face of the end frame member 3 and spaced below the partition wall plate 6 as shown in FIG. 2. The cover supporting plate 7 is positioned at a height substantially equal to that of the shoulders 4a and 5a of the side frame members 4 and 5.

An upper cover 8 has an upper edge 8a downwardly bent and engaging over the upper end of the end frame member 3 in a removable fashion. The upper cover 8 has a lower edge 8b fastened to the vertical flange 6a by screws. Thus, the upper cover 8 forms a cover closing a hydraulic compartment 9 defined by the end frame members 3 and the side frame members 4 and 5. Provided beneath the hydraulic compartment 9 is an electrical compartment 11 defined by the end frame member 3 and the side frame members 4 and 5 and closed by a lower cover 10. The lower cover 10 has an upper edge 10a fastened to the vertical flange 6a by screws and a lower edge 10b screwed down to the cover supporting plate 7.

Figure 3:
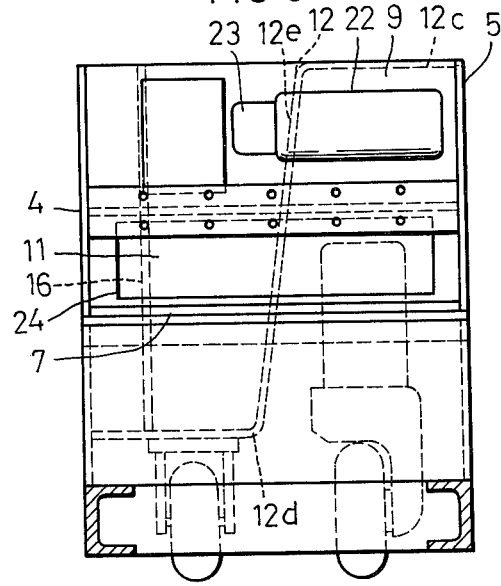
FIG. 3 is a front elevational view partly in section of the truck shown in FIG. 2.
Figure 4:
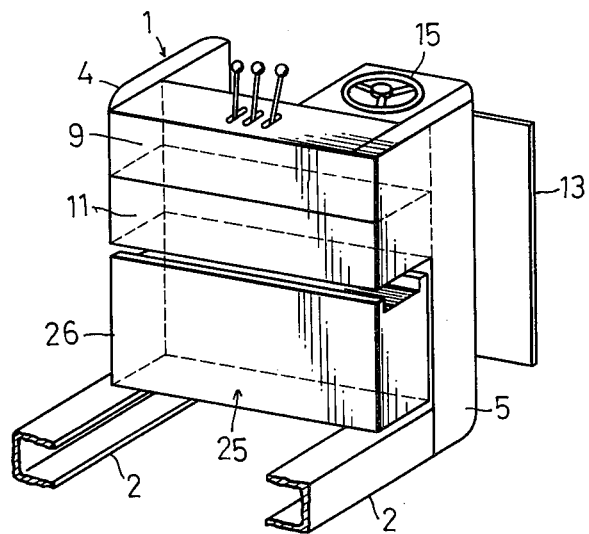
FIG. 4 is a perspective view of the truck shown in FIG. 2 as viewed from the front side.

A stepped partition wall plate 12 is provided at the rear end of the truck 1 as shown in FIGS. 3 and 5. The partition wall 12 has an outer edge 12a exposed at the rear end of the truck 1 and an inner edge 12b welded to the end frame member 3. The partition wall plate 12 is bent along a pair of transverse lines which define a pair of horizontally extending end portions 12c and 12d and an oblique middle portion 12e extending downwardly from the upper end portion 12c to the lower end portion 12d. The upper end portion 12c has a free end connected to the side frame member 5. The end frame member 3, the side frame member 5 and the partition wall plate 12 provide therebetween a hollow space which define a driving unit compartment 14. A door 13 is hinged to the rear edge of the side frame member 5 to close the driving unit compartment 14. The driving unit compartment 14 is larger in space at its bottom than at its top, as shown in FIG. 5, because of the oblique construction of the partition wall plate 12. The lower end portion 12d of the partition wall plate 12 provides a floor of the operator's cab. A steering wheel 15 is rotatably supported by the upper end portion 12c.

A vertical partition wall 16 is provided between the side frame member 4 and the oblique partition wall 12 as shown in FIGS. 1 and 3 and has a front edge welded to the rear face of the end frame member 3. The partition wall 16 has a rear edge welded to the rear edge of the side frame member 4 and an upper edge welded to the inwardly bent upper edge of the side frame member 4.

The partition wall 16 has a lower edge welded to the upper face of the lower end portion 12d of the partition wall 12. Thus, a tank 17 for hydraulic fluid is defined by the end frame member 3, the side frame member 4 and the partition walls 12 and 16. The tank 17 has a breadth B (FIG. 1) which is large enough to prevent the operator's arm from projecting beyond the lateral extremity of the truck 1 during operation. The tank 17, thus, defines a protective wall for the operator.

Figure 6:
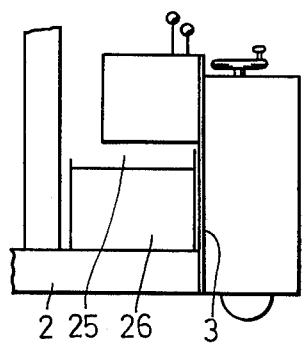
FIG. 6 is a fragmentary side elevational view showing a modified form the truck shown in FIG. 2.
Figure 7:
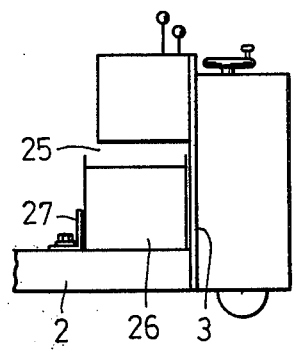
FIG. 7 is a view similar to FIG. 6, illustrating a modified form of the truck shown in FIG. 6.

The driving unit compartment 14 accommodates a drive motor assembly 18 connected to the end frame member 3 by link and spring connection not shown. A transformer 20 is installed above the drive motor assembly 18 in the driving unit compartment 14 and supported on the end frame member 3. A battery charging unit 19 is connected to the transformer 20. The hydraulic compartment 9 accommodates a control valve 21, a hydraulic pump 23 with an electric motor 22 and hydraulic conduits not shown, which are all supported on the end frame member 3. The electrical compartment 11 accommodates a control cubicle 24 supported on the end frame member 3. Provided below the electrical compartment 11 is a battery compartment 25 defined by the upper surfaces of the bottom frame members 2, the front face of the end frame member 3 and the lower face of the lower cover 10, and accommodating a battery 26. The front end of the battery compartment 25 is open and, therefore, provides an ample space for accommodating a battery of different size or capacity as shown in FIG. 6. The battery compartment 25 may alternatively be provided at its open front end with an end plate or stop member 27 as shown in FIG. 7. The end plate 27 may comprise a channel-shaped member removably fastened to the bottom frame members 2 by screws or any other appropriate means. The end plate 27 provides a positive means for preventing any undesirable displacement of the battery 26 during the movement of the truck 1. The battery compartment 25 is also open at its opposite lateral ends due to the aforementioned shape of the side frame members 4 and 5.

It will be noted that this invention provides an improved battery operated fork-lift truck having a member of compartments separated from one another by the end frame member 3, the side frame members 4 and 5, the first partition wall 6, the second partition wall 12 and the third partition wall 16.

What we claim is:

1. A battery operated fork-lift truck comprising:
   an end frame member vertically extending from a base support adjacent to the rear end of said truck;
   an operator's cab provided behind said end frame member and open at said rear end of said truck;
   a plurality of compartments defined by said end frame member around said operator's cab, said compartments being of individually and mutually substantially closed construction and including a first compartment for hydraulic apparatus, a second compartment for electrical control devices and a third compartment for a driving unit;
   a first partition wall extending from said end frame member and defining said first and second compartments in front of said end frame member;
   means defining a separate open space below said first and second compartments; and
   a second partition wall extending from said end frame member along the height of said operator's cab and defining said third compartment adjacent to said operator's cab behind said end frame member.

2. The fork-lift truck as defined in claim 1, further including a third partition wall extending from said end frame member along the height of said operator's cab and defining a tank for hydraulic fluid behind said end frame member on the opposite side of said operator's cab from said third compartment.

3. The fork-lift truck as defined in claim 1, wherein said separate open space is open at its front end and at its opposite lateral ends and defines a battery compartment.

4. The fork-lift truck as defined in claim 3, wherein said first, second and battery compartments are defined in front of said end frame member and said third compartment, said operator's cab and a tank for hydraulic fluid are defined behind said end frame member.

5. A battery operated fork-lift truck comprising:
an end frame member vertically extending from a base support adjacent to the rear end of said truck;
an operator's cab provided behind said end frame member and open at said rear end of said truck;
a plurality of compartments defined by said end frame member around said operator's cab, said compartments being of individually and mutually substantially closed construction and including a first compartment for hydraulic apparatus, a second compartment for electrical control devices and a third compartment for a driving unit;
a pair of parallel side frame members vertically extending from said base support and connected to said end frame member at right angles thereto;
a first partition wall extending from said end frame member cooperating with said side frame members to define said first and second compartments and a battery compartment;
a second partition wall extending from said end frame member; and
a third partition wall extending from said end frame member;
said end and side frame members and said second and third partition walls defining said third compartment, said operator's cab and a tank for hydraulic fluid.

6. The fork-lift truck as defined in claim 5, including:
a removable cover for closing said first compartment, said cover having one end fastened to said end frame member and an opposite end fastened to said first partition wall;
a removable cover for closing said second compartment and having one end fastened to said first partition wall and an opposite end fastened to said end frame member; and
a door for closing said third compartment, said door having one edge hinged to one of said side frame members and an opposite edge movable to and away from said second partition wall.

7. The fork-lift truck as defined in claim 5, wherein each of said side frame members is formed with a downwardly facing shoulder in front of said end frame member, said shoulder defining a lateral opening for said battery compartment.

* * * * *

UNITED STATES PATENT AND TRADEMARK OFFICE
CERTIFICATE OF CORRECTION

PATENT NO. : 4,090,578
DATED : May 23, 1978
INVENTOR(S) : Shinoda et al

It is certified that error appears in the above-identified patent and that said Letters Patent are hereby corrected as shown below:

In the specification; column 4, the word "member" spanning lines 42 and 43, should read -- number --.

Signed and Sealed this

Twenty-sixth Day of December 1978

[SEAL]

Attest:

RUTH C. MASON
*Attesting Officer*

DONALD W. BANNER
*Commissioner of Patents and Trademarks*